(12) United States Patent
Edelman

(10) Patent No.: US 11,654,950 B1
(45) Date of Patent: May 23, 2023

(54) COMPACT HIKING SLED DEVICE

(71) Applicant: Bradley T. Edelman, Kent, WA (US)

(72) Inventor: Bradley T. Edelman, Kent, WA (US)

( * ) Notice: Subject to any disclaimer, the term of this patent is extended or adjusted under 35 U.S.C. 154(b) by 0 days.

(21) Appl. No.: 17/521,977

(22) Filed: Nov. 9, 2021

(51) Int. Cl.
*B62B 17/08* (2006.01)
*B62B 17/06* (2006.01)

(52) U.S. Cl.
CPC ............ *B62B 17/08* (2013.01); *B62B 17/061* (2013.01); *B62B 17/063* (2013.01)

(58) Field of Classification Search
CPC ...... B62B 17/08; B62B 17/061; B62B 17/063
See application file for complete search history.

(56) References Cited

U.S. PATENT DOCUMENTS

| | | | | |
|---|---|---|---|---|
| 249,081 | A * | 11/1881 | Nye | B62B 17/08 188/8 |
| 965,870 | A * | 8/1910 | Casaday | B63H 5/165 440/73 |
| 3,414,284 | A * | 12/1968 | Rosekrans, Jr. | B62B 13/00 280/18 |
| 3,824,945 | A * | 7/1974 | Casciano | B63B 34/60 441/79 |
| 4,302,858 | A * | 12/1981 | Casciano | B63B 34/54 440/34 |
| 6,116,622 | A * | 9/2000 | Gibbons | B62B 17/08 280/22.1 |
| 9,296,408 | B1 * | 3/2016 | Springwater | B62B 15/007 |
| 10,773,120 | B2 * | 9/2020 | St. Cyr | A63B 21/00069 |
| 2004/0140636 | A1 * | 7/2004 | Fitzgerald | B62B 17/08 280/18 |
| 2007/0032358 | A1 * | 2/2007 | Chen | A61H 1/0218 482/144 |
| 2009/0179392 | A1 * | 7/2009 | Kuhbacher | B62B 13/14 280/22.1 |

FOREIGN PATENT DOCUMENTS

| | | | | |
|---|---|---|---|---|
| CH | 183713 | A * | 4/1936 | |
| CN | 113386846 | A * | 9/2021 | |
| CN | 216833868 | U * | 6/2022 | |
| DE | 2404337 | B * | 7/1975 | ............ B62B 13/18 |
| DE | 2801859 | A1 * | 7/1979 | ............ B63B 35/73 |
| DE | 3601607 | A1 * | 7/1987 | |
| FR | 1388769 | A * | 2/1965 | |
| FR | 2358308 | A1 * | 2/1978 | |
| RU | 124648 | U1 * | 2/2013 | |
| SE | 436998 | B * | 2/1985 | |

* cited by examiner

*Primary Examiner* — James A Shriver, II
*Assistant Examiner* — Michael T. Walsh

(57) ABSTRACT

A compact hiking sled device facilitates descent on snowy terrain while being lightweight and compact to facilitate hiking to an elevated position. The device includes a hull having a front side, a pair of lateral sides, a back side, a bottom side, and an interior space. Each of a pair of brake levers is pivotally coupled to a respective one of the lateral sides. A seat is positioned within the interior space. A thigh bar extends between the lateral sides of said hull adjacent to a front of the seat. A calf rest bar is adjacent to the front side of the hull. Each of a plurality of carrying straps is attachable to the hull for carrying the hull like a backpack.

16 Claims, 8 Drawing Sheets

COMPACT HIKING SLED DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sled devices and more particularly pertains to a new sled device for facilitating descent on snowy terrain while being lightweight and compact to facilitate hiking to an elevated position.

(2) Description of Related Art Including Information Disclosed Under 37 CFR 1.97 and 1.98

The prior art relates to sled devices. The known prior art is generally heavy or cumbersome for hiking, particularly when hiking to an elevated position.

BRIEF SUMMARY OF THE INVENTION

An embodiment of the disclosure meets the needs presented above by generally comprising a hull having a front side, a pair of lateral sides, a back side, a bottom side, and an interior space. Each of a pair of brake levers is pivotally coupled to a respective one of the lateral sides. A seat is positioned within the interior space. A thigh bar extends between the lateral sides of said hull adjacent to a front of the seat. A calf rest bar is adjacent to the front side of the hull. Each of a plurality of carrying straps is attachable to the hull for carrying the hull like a backpack.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
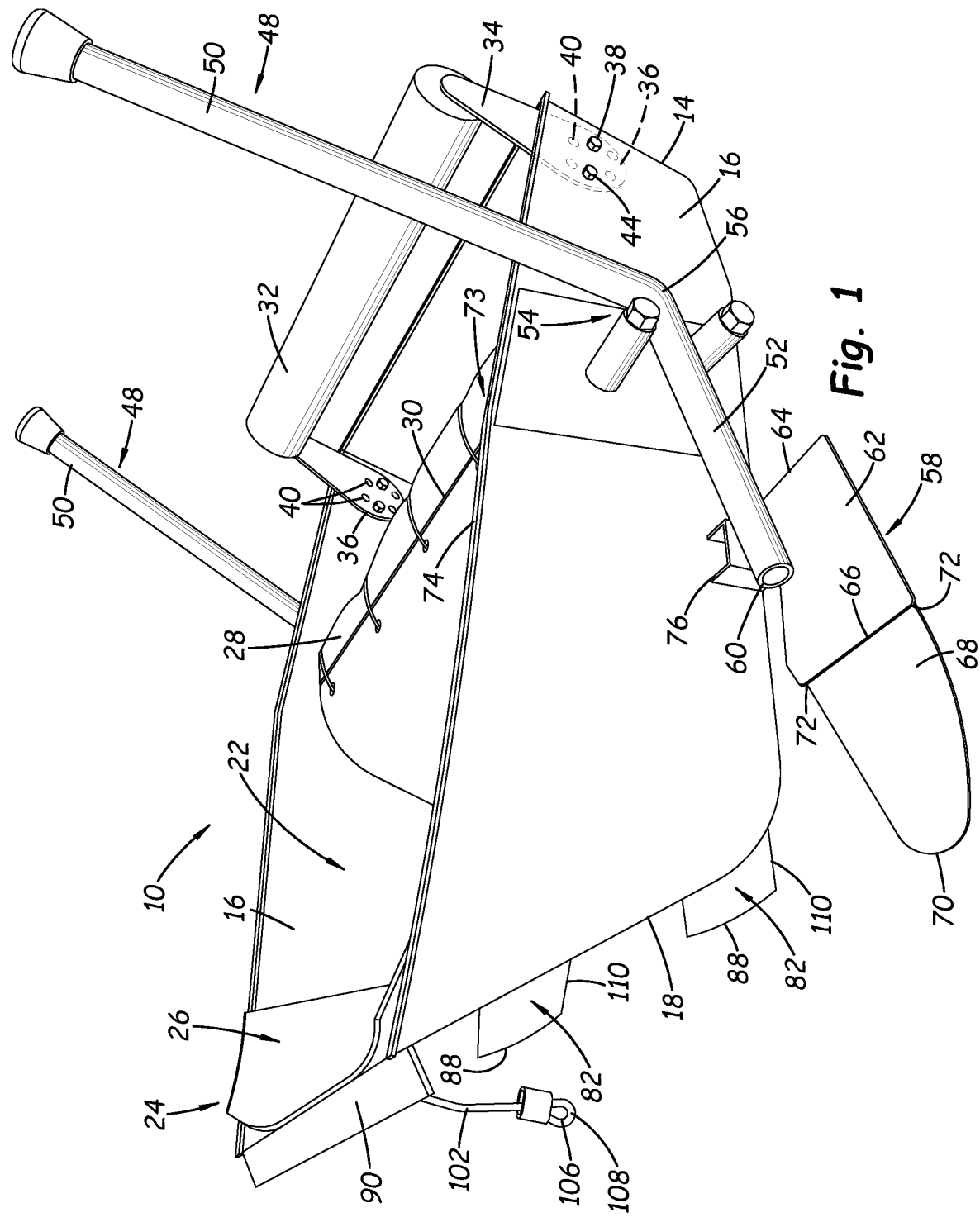
FIG. 1 is a top rear side perspective view of a compact hiking sled device according to an embodiment of the disclosure.
Figure 2:
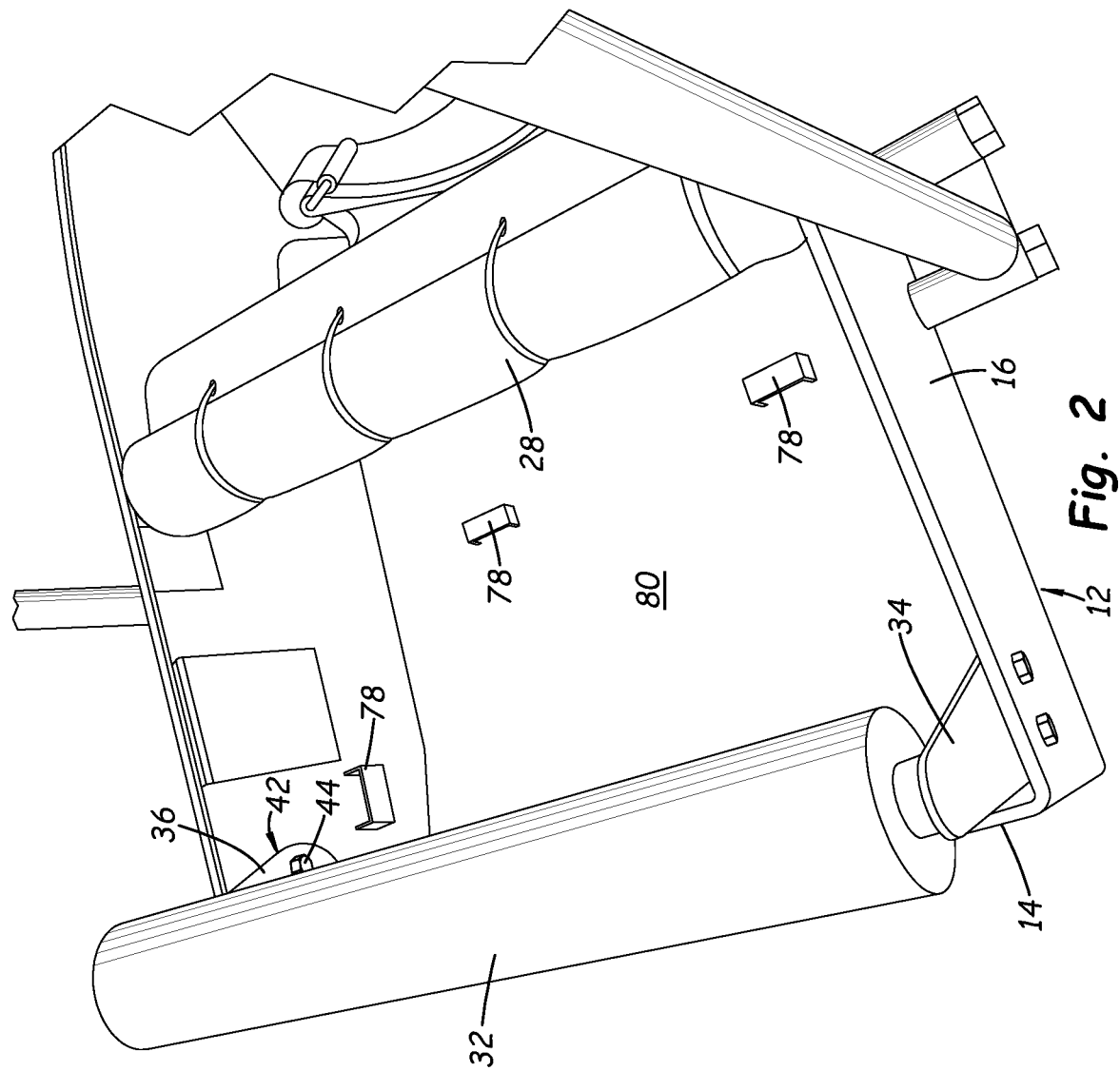
FIG. 2 is a top front side detailed perspective view of a front section of an embodiment of the disclosure.
Figure 3:
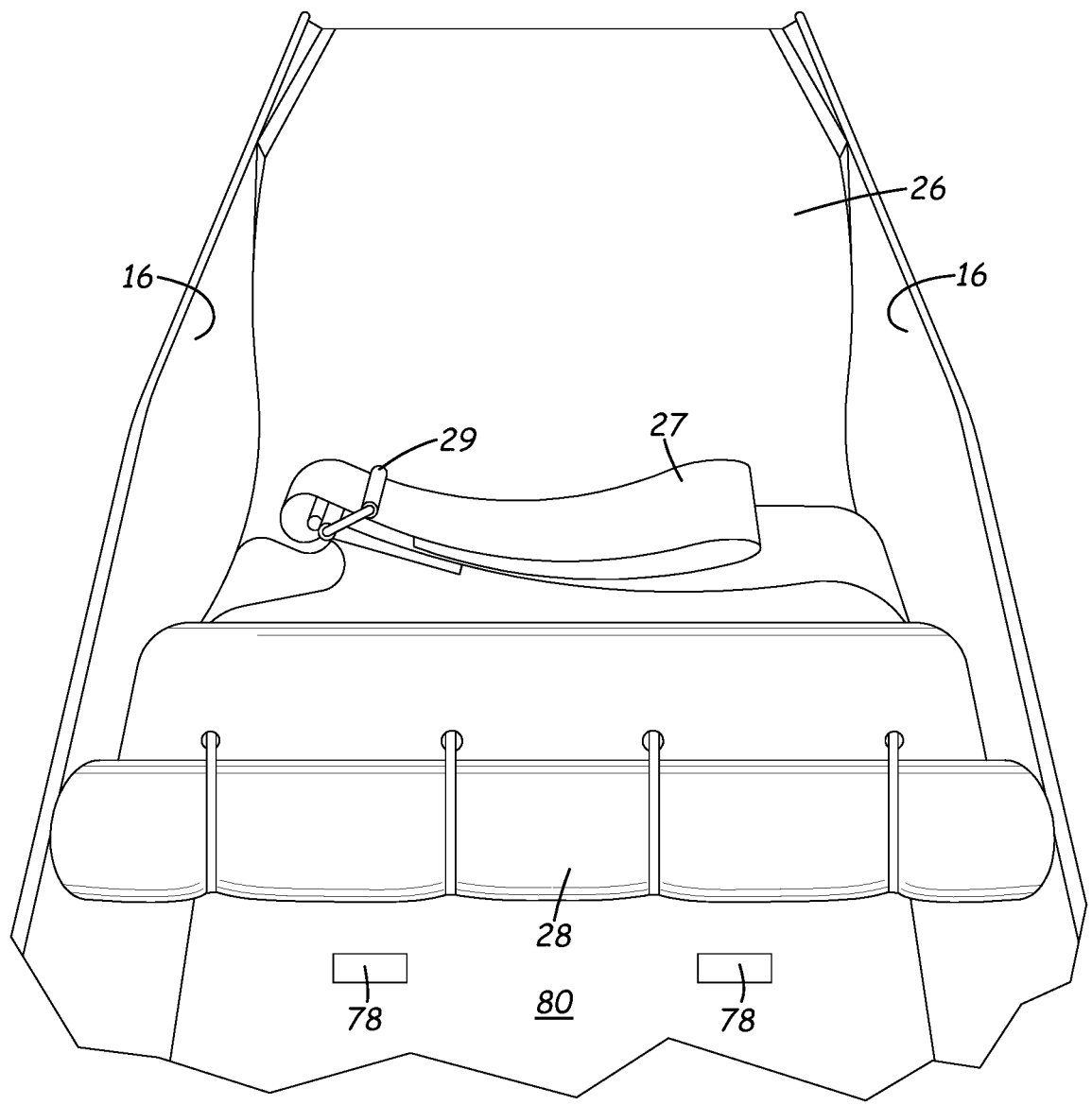
FIG. 3 is a front detailed view of a rear section of an embodiment of the disclosure.
Figure 4:
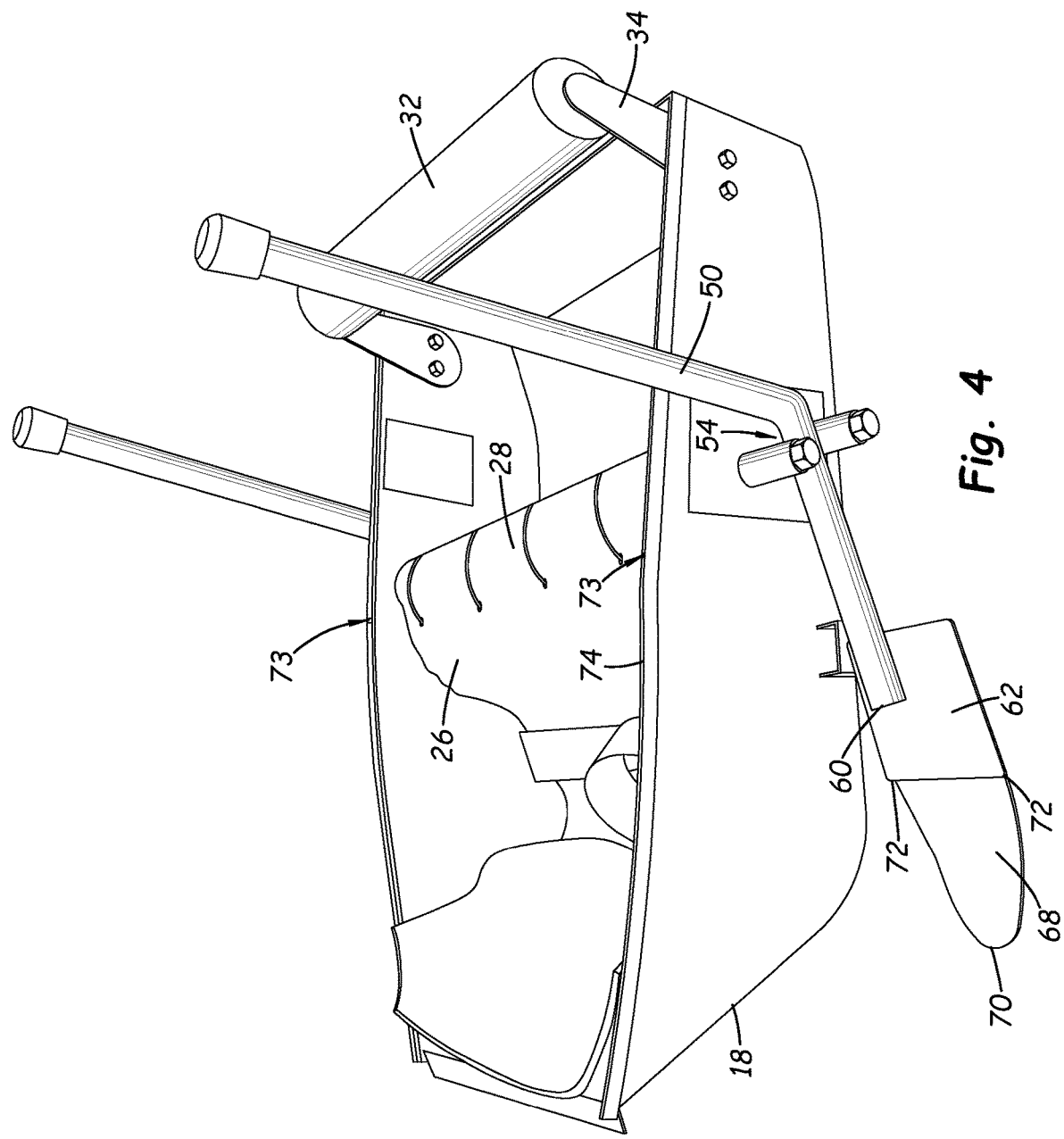
FIG. 4 is a top side perspective view of an embodiment of the disclosure.
Figure 5:
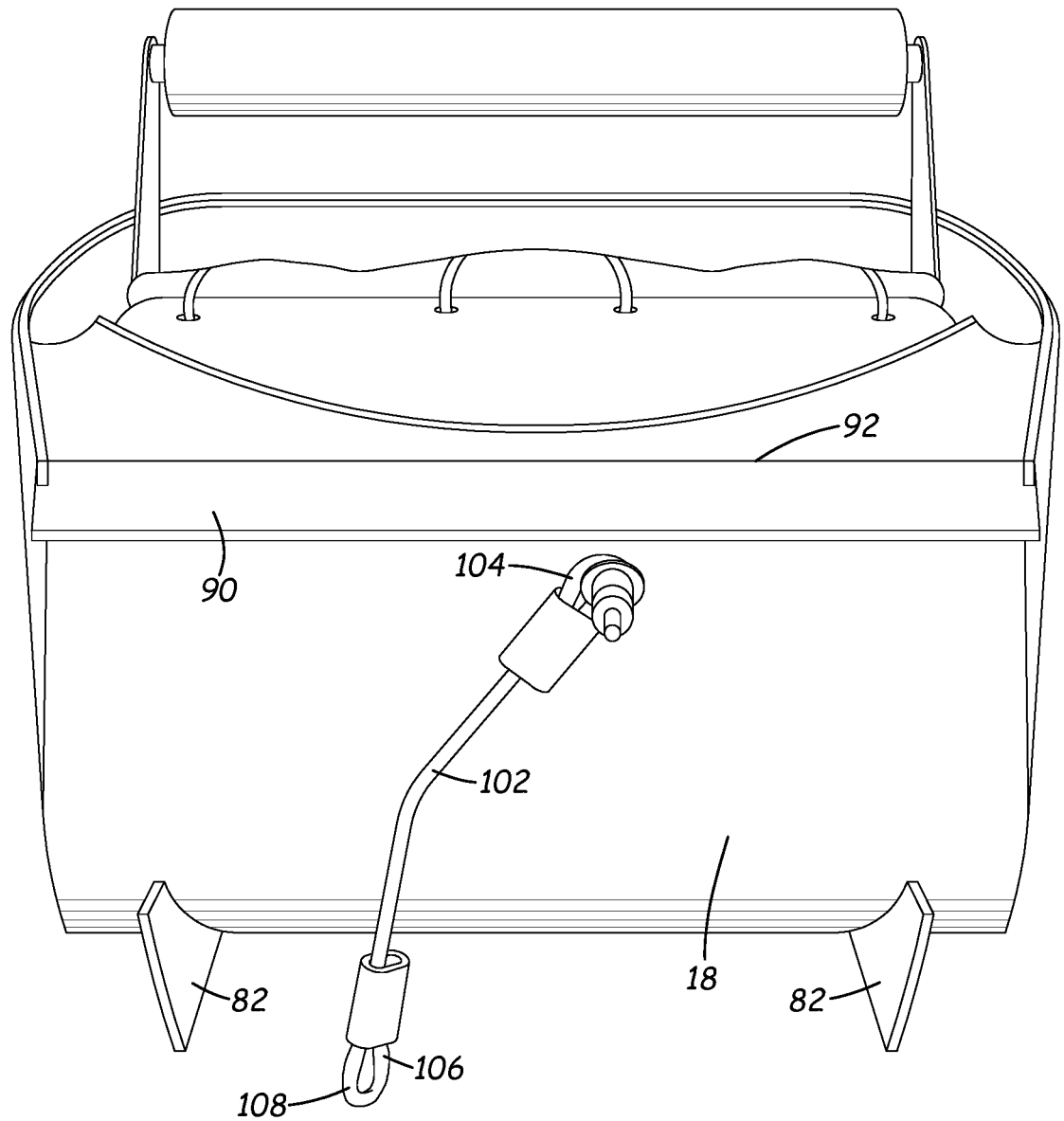
FIG. 5 is a top rear perspective view of an embodiment of the disclosure.
Figure 6:
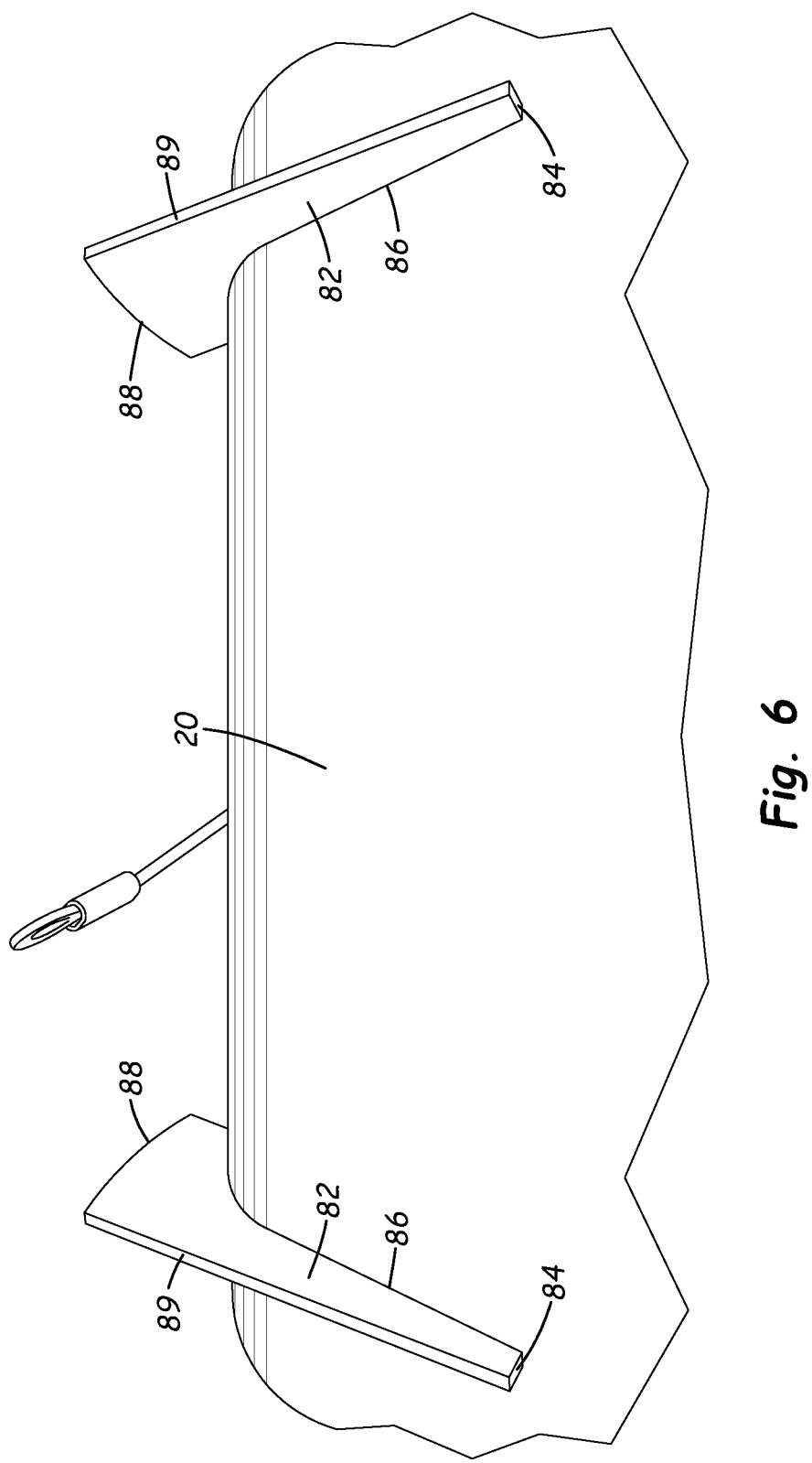
FIG. 6 is a partial bottom view of an embodiment of the disclosure.
Figure 7:
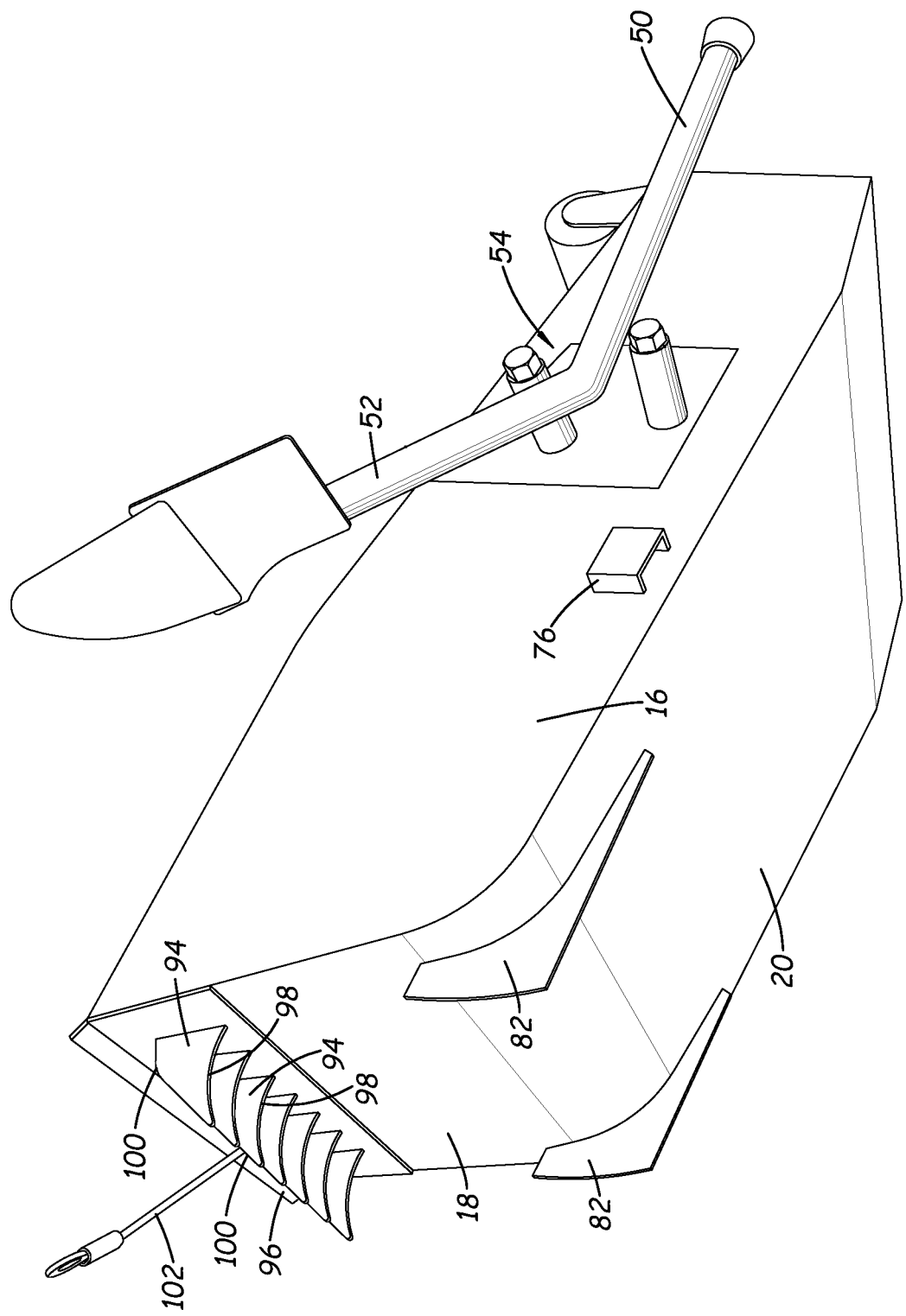
FIG. 7 is a bottom rear side perspective view of an embodiment of the disclosure.
Figure 8:
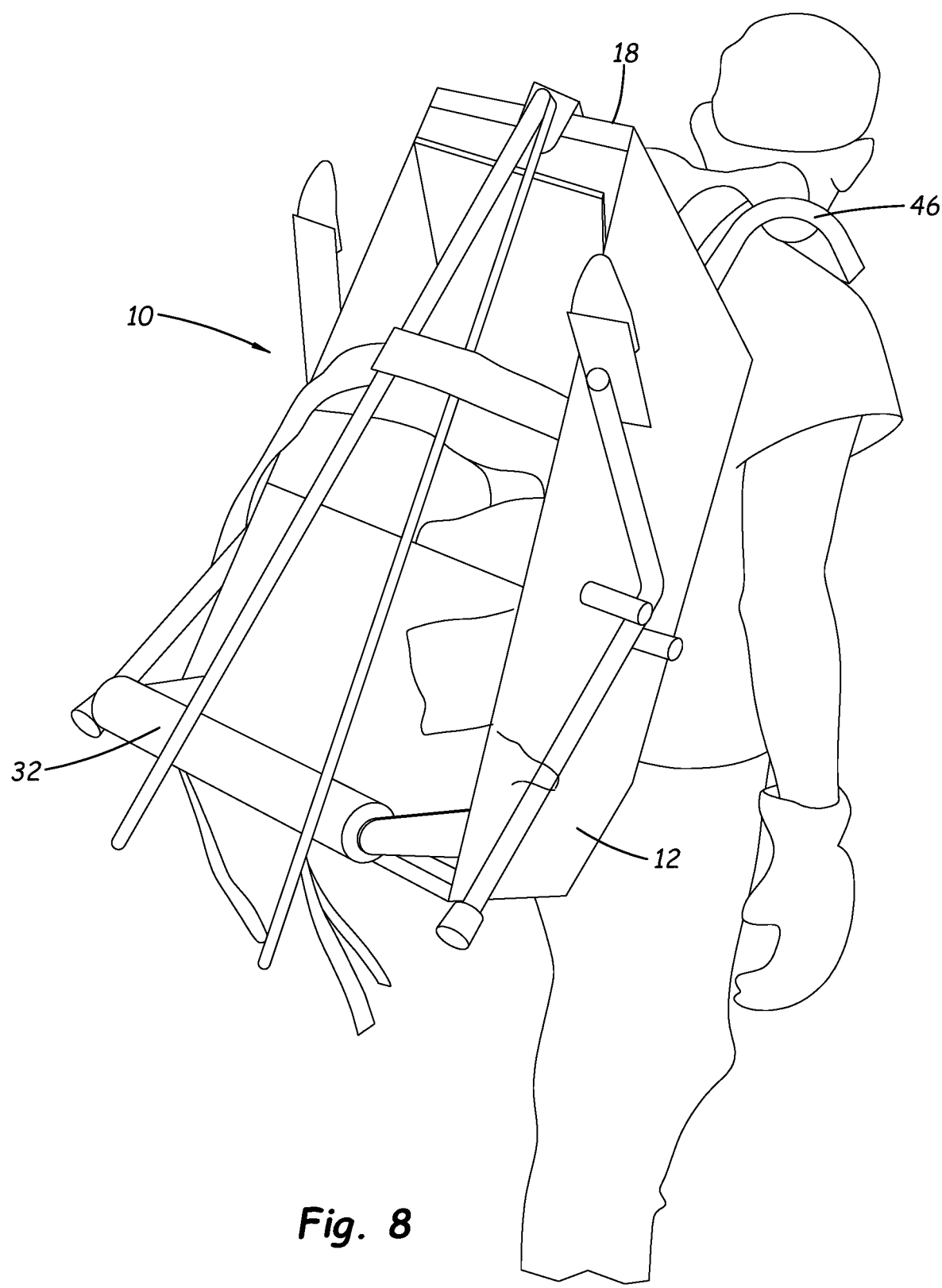
FIG. 8 is a top side perspective view of an embodiment of the disclosure in use.

With reference now to the drawings, and in particular to FIGS. 1 through 8 thereof, a new sled device embodying the principles and concepts of an embodiment of the disclosure and generally designated by the reference numeral 10 will be described.

As best illustrated in FIGS. 1 through 8, the compact hiking sled device 10 generally comprises a hull 12. The hull 12 may be constructed of durable but lightweight aluminum or the like. The hull has a front side 14, a pair of lateral sides 16, a back side 18, and a bottom side 20. The hull 12 defines an interior space 22. A transition from the bottom side 20 of the hull 12 to the back side 18 of the hull 12 is arcuate and smooth. This allows a user to lean back while sitting in the hull 12, similar to being in a rocker, for lifting the front side 14 when desired. The size of the hull 12 is generally compact with the hull 12 having a maximum width between 16 and 20 inches. The depth of the interior space 22 varies along a length of the hull 12 and is within the range of 4 to 9 inches. The bottom side 18 is planar for a range of between 22 to 25 inches. The lateral sides 16 of the hull 12 are angled such that the hull 12 tapers extending from a middle of the hull 12 towards the front side 14 of the hull 12 to prevent snow from collecting in front of the hull 12 and impeding movement of the hull 12. The front side 14 has a width between 15 and 17 inches. The lateral sides 16 of the hull 12 are also curved such that a rear portion 24 of the hull 12 flares extending from the back side 18 of the hull 12 towards the middle of the hull 12. A width of the hull 12 at the back side 18 is between 13 and 16 inches. A seat 26 is positioned within the interior space 22 of the hull 12. The seat 26 may be formed by a layer of material coupled at forward and rear edges to the hull 12 forming a sling type seat. A seat belt 27 may be provided having opposite ends coupled to the lateral sides 16 and a buckle 29 to allow the user to strap into the seat 26.

A thigh bar 28 is coupled to and extends between the lateral sides 16 of the hull 12 adjacent to a front 30 of the seat 26. The thigh bar 28 may be padded. A calf rest bar 32 is coupled to the hull 12 adjacent to the front side 14 of the hull 12. The calf rest bar 32 may also be padded. A position of the calf rest bar 32 relative to the hull 12 may be adjustable. The calf rest bar 32 may be coupled to supports 34 attached to the lateral sides 16 of the hull 12. Each support 34 may have a lower disc section 36 with apertures 40 offset from a pivotal connection 38 with the lateral side 16 of the hull 12. Each aperture 40 is selectively positionable in alignment with a connection hole 42 in the lateral side 16 of the hull 12. The position of the support 34 is secured by a bolt 44, or the like such as a cotter pin. Adjustment of the support 34 positions the calf rest bar 32 in a selectable position relative to the hull 12.

Each of a plurality of carrying straps 46 is attachable to the hull 12 such that the hull 12 is configured for being carried adjacent to a back of a user with the carrying straps 46 extending around shoulders of the user. The carrying straps 46 may be attached to dedicated strap connectors or to other structures extending from the hull 12.

Each of a pair of brake levers 48 is pivotally coupled to a respective one of the lateral sides 16 of the hull 12. Each brake lever 48 comprises a handle section 50 coupled to an extension section 52. The extension section 52 of each brake lever 48 forms an angle 54 with the respective handle section 50. The angle 54 is greater than 90 degrees and less than 180 degrees. The extension section 52 of each brake lever 48 extends towards the back side 18 of the hull 12. Conventional stops may be provided on the hull 12 to limit motion of the brake levers 48 or the brake levers 48 may be tethered to the hull 12 for the same purpose. A junction 56 of the handle section 50 and the extension section 52 is pivotally coupled to the respective one of the lateral sides 16 of the hull 12. This area of the lateral sides 16 may be reinforced to enhance durability of the connection of the brake levers 48. A brake 58 is coupled to a distal end 60 of the extension section 52 relative to the handle section 50. Each brake 58 further comprises a base section 62 having a front edge 64 and a back edge 66. The front edge 64 has an arcuate shape oriented perpendicular to a longitudinal axis of the extension section 52 of the brake lever 48. The back edge 66 is straight. Each brake 58 includes a brake foot 68 coupled to the base section 62 such that the brake foot 68 extends from the back edge 66 of the base section 62. The brake foot 68 of each brake 58 has a curved distal edge 70 relative to the base section 62. The curved distal edge 70 is parabolic shaped between opposite ends 72 of the back edge 66 of the brake foot 68 of each brake 58.

Grasping the handle section 50 to pivot the brake levers 48 downwardly away from the bottom side 20 of the hull 12 engages the brakes 58 with the ground or snow on the ground to facilitate control of the movement of the hull 12 on the ground. The brake levers 48 move independently from each other to facilitate steering of the hull 12 using the brake levers 48. Each of a pair of brake detents 73 is positioned on a respective one of the lateral sides 16 of the hull 12 along a top edge 74 of the lateral side 16 of the hull 12. Each detent 73 is positioned to receive the handle section 50 of a respective one of the brake levers 48 when the brake lever 48 is positioned in a braking position wherein the brakes 58 are extended from the hull 12 sufficiently to engage snow or ground under the hull 12 for stopping movement of the hull 12 on the ground. The detents 73 allow the user to apply inward pressure to keep the brake levers 48 within the detents 73 to resist sliding of the handle portion 50 along the lateral side 16 to maintain the braking position. Each of a pair of brake connection brackets 76 is positioned on a respective one of the lateral sides 16 of the hull 12. Each of the brake connection brackets 76 is spaced from a pivot point of an associated one of the brake levers 48 wherein the associated one of the brake levers 48 is securable to the brake connection bracket 76 for holding the brake connection bracket 48 in a static position. This inhibits movement of the brake levers 48 while the hull 12 is being carried by the user.

Each of a plurality of attachment brackets 78 is coupled to the hull 12. The attachment brackets may be positioned in the interior space 22 along a floor 80 of the hull 12 and on the lateral sides 16. Each of the attachment brackets 78 is configured for being engaged by a strap, or the like, for securing cargo to the hull 12. These attachment brackets 78 may also be used for attachment of the carrying straps 46.

Each of a pair of skegs 82 is coupled to the hull 12. The skegs 82 are parallel and spaced on the hull 12 between 10 and 14 inches apart. Each of the skegs 82 has a respective front end 84 extending from the bottom side 20 of the hull 12. Each of the skegs 82 has a respective top edge 86 extending along the hull 12 from the bottom side 20 to the back side 18. Each of the skegs 82 has a respective back end 88 extended from the back side 18 of the hull 12. Each of the skegs 82 has a bottom edge 89 which is spaced and substantially parallel to the bottom side 20 of the hull 12. A length of a bottom edge 110 of each skeg 82 is between 5 and 7 inches.

A lip 90 extends from the back side 18 of the hull 12. The lip 90 is positioned at a top edge 92 of the back side 18 of the hull 12. Each of a plurality of teeth 94 is coupled to and extends from the back side 18 of the hull 12 adjacent to a bottom surface 96 of the lip 90. The teeth 94 are parallel and spaced between the lateral sides 16 of the hull 12. Each tooth 94 has a concave edge 98 opposite a convex edge 100 such that each tooth 90 has an arcuate shape extending from the lip 90. The teeth 94 are positioned to engage the ground to slow or stop motion of the hull 12 on the ground should the hull 12 tip backwards beyond a desired degree. A tow line 102 has a proximal end 104 coupled to the back side 18 of the hull 12. The tow line 102 may have a loop 106 positioned on a distal end 108 of the tow line 102 relative to the hull 12. The tow line 102 may be a metal cable or the like.

In use, the hull 12 may be strapped to the user and worn like a backpack. Additional cargo may be tied or otherwise secured to the hull 12. A total weight of the compact hiking sled device 10 may be in the range of 12 to 18 pounds without cargo to reduce the burden of carrying the device 10 to high elevations. When the user is ready to descent, the hull 12 is placed on the ground and the user sits in the hull 12. The user grasps the brake levers 48 to control speed and direction of descent as gravity acts on the device 10 and user to descend from the elevated position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A compact hiking sled device comprising:
a hull, said hull having a front side, a pair of lateral sides, a back side, and a bottom side, the bottom side and the back side each being planar, the hull defining an interior space, a transition from said bottom side of said hull to said back side of said hull being arcuate;
a pair of brake levers, each brake lever being pivotally coupled to a respective one of said lateral sides of said hull;
a seat positioned within said interior space of said hull;
a thigh bar coupled to and extending between said lateral sides of said hull adjacent to a front of said seat;
a calf rest bar coupled to said hull adjacent to said front side of said hull;
a plurality of carrying straps, said plurality of carrying straps being attachable to said hull such that said hull is configured for being carried adjacent to a back of a user with said carrying straps extending around shoulders of the user;
a pair of skegs coupled to said hull, said skegs being parallel and spaced on said hull, each of said skegs having a respective front end extending from said bottom side of said hull, each of said skegs having a respective top edge extending along said hull from said bottom side to said back side, each of said skegs having a respective back end extended from said back side of said hull.

2. The compact hiking sled device of claim 1, further comprising a tow line having a proximal end coupled to said front side of said hull, said tow line having a loop positioned on a distal end of said tow line relative to said hull.

3. The compact hiking sled device of claim 2, further comprising a pair of brake connection brackets, each brake connection bracket being positioned on a respective one of said lateral sides of said hull, each of said brake connection brackets being spaced from a pivot point of an associated one of said brake levers wherein said associated one of said brake levers is securable to said brake connection bracket for holding said brake connection bracket in a static position.

4. The compact hiking sled device of claim 2, further comprising each brake lever comprising:
a handle section coupled to an extension section;
a junction of said handle section and said extension section being pivotally coupled to said respective one of said lateral sides of said hull;
a brake coupled to a distal end of said extension section relative to said handle section.

5. The compact hiking sled device of claim 4, wherein each brake further comprises:
a base section, said base section having a front edge, said back edge being straight; and
a brake foot, said brake foot being coupled to said base section such that said brake foot extends from said back edge of said base section.

6. The compact hiking sled device of claim 5, further comprising said brake foot of each brake having a curved distal edge relative to said base section, said curved distal edge being parabolic shaped between opposite ends of said back edge of said brake foot of each brake.

7. The compact hiking sled device of claim 2, further comprising said extension section of each brake lever forming an angle with said handle section, said angle being greater than 90 degrees and less than 180 degrees.

8. The compact hiking sled device of claim 2, further comprising said extension section of each brake lever extending towards said back side of said hull.

9. The compact hiking sled device of claim 1, further comprising said lateral sides of said hull being angled such that said hull tapers extending from a middle of said hull towards said front side of said hull.

10. The compact hiking sled device of claim 1, further comprising said lateral sides of said hull being curved such that a rear portion of said hull flares extending from said back side of said hull towards a middle of said hull.

11. The compact hiking sled device of claim 1, further comprising said thigh bar being padded.

12. The compact hiking sled device of claim 1, further comprising said calf rest bar being padded.

13. The compact hiking sled device of claim 1, further comprising a position of said calf rest bar relative to said hull being adjustable.

14. The compact hiking sled device of claim 1, further comprising a plurality of attachment brackets coupled to said hull, each of said attachment brackets being configured for being engaged by a strap for securing cargo to said hull.

15. The compact hiking sled device of claim 1, further comprising:
a lip extending from said back side of said hull, said lip being positioned at a top edge of said back side of said hull; and
a plurality of teeth coupled to said back side of said hull and extending from said back side of said hull adjacent to a bottom surface of said lip, said teeth being parallel to each other and oriented parallel to a longitudinal axis extending from said front side of said hull to said back side of said hull.

16. A compact hiking sled device comprising:
a hull, said hull having a front side, a pair of lateral sides, a back side, and a bottom side, the bottom side and the back side each being planar, the hull defining an interior space, a transition from said bottom side of said hull to said back side of said hull being arcuate, said lateral sides of said hull being angled such that said hull tapers extending from a middle of said hull towards said front side of said hull, said lateral sides of said hull being curved such that a rear portion of said hull flares extending from said back side of said hull towards a middle of said hull;
a seat positioned within said interior space of said hull;
a thigh bar coupled to and extending between said lateral sides of said hull adjacent to a front of said seat, said thigh bar being padded;
a calf rest bar coupled to said hull adjacent to said front side of said hull, said calf rest bar being padded, a position of said calf rest bar relative to said hull being adjustable;
a plurality of carrying straps, said plurality of carrying straps being attachable to said hull such that said hull is configured for being carried adjacent to a back of a user with said carrying straps extending around shoulders of the user;

a pair of brake levers, each brake lever being pivotally coupled to a respective one of said lateral sides of said hull, each brake lever comprising a handle section coupled to an extension section, said extension section of each brake lever forming an angle with said handle section, said angle being greater than 90 degrees and less than 180 degrees, said extension section of each brake lever extending towards said back side of said hull, a junction of said handle section and said extension section being pivotally coupled to said respective one of said lateral sides of said hull, and a brake coupled to a distal end of said extension section relative to said handle section, wherein each brake further comprises a base section, said base section having a front edge and a back edge, said back edge being straight, and a brake foot, said brake foot being coupled to said base section such that said brake foot extends from said back edge of said base section, said brake foot of each brake having a curved distal edge relative to said base section, said curved distal edge being parabolic shaped between opposite ends of said back edge of said brake foot of each brake;

a pair of brake connection brackets, each brake connection bracket being positioned on a respective one of said lateral sides of said hull, each of said brake connection brackets being spaced from a pivot point of an associated one of said brake levers wherein said associated one of said brake levers is securable to said brake connection bracket for holding said brake connection bracket in a static position;

a plurality of attachment brackets coupled to said hull, each of said attachment brackets being configured for being engaged by a strap for securing cargo to said hull;

a pair of skegs coupled to said hull, said skegs being parallel and spaced on said hull, each of said skegs having a respective front end extending from said bottom of said hull, each of said skegs having a respective top edge extending along said hull from said bottom side to said back side, each of said skegs having a respective back end extended from said back side of said hull;

a lip extending from said back side of said hull, said lip being positioned at a top edge of said back side of said hull;

a plurality of teeth coupled to said back side of said hull and extending from said back side of said hull adjacent to a bottom surface of said lip; and a tow line having a proximal end coupled to said front side of said hull, said tow line having a loop positioned on a distal end of said tow line relative to said hull.

* * * * *